Dec. 27, 1932.  J. BIJUR  1,892,133
SUPPLY INSTALLATION FOR CENTRAL CHASSIS LUBRICATION
Original Filed April 9, 1927   2 Sheets-Sheet 1
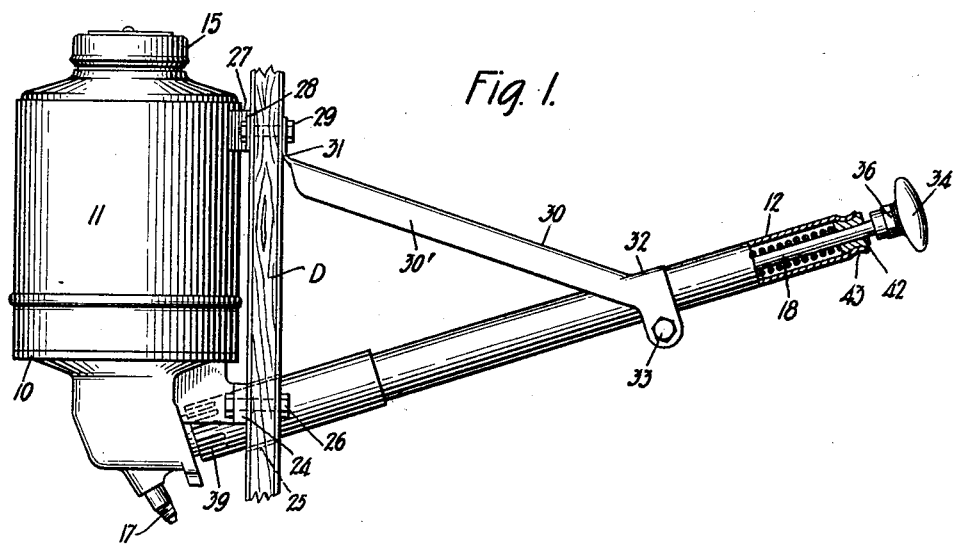
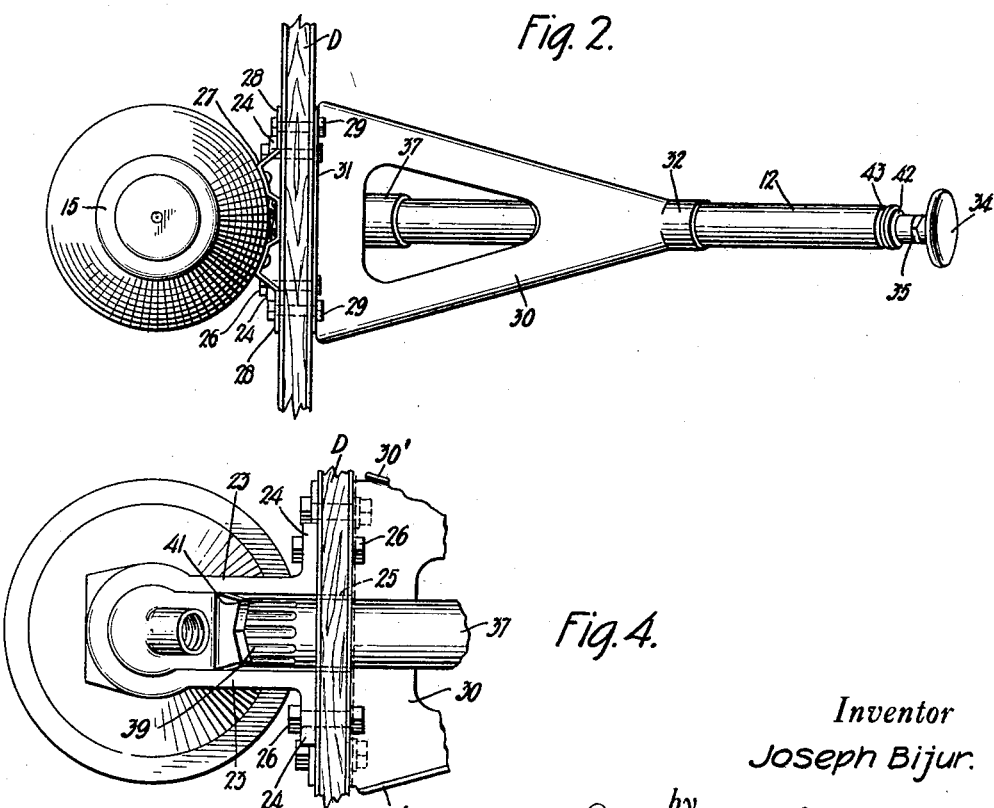
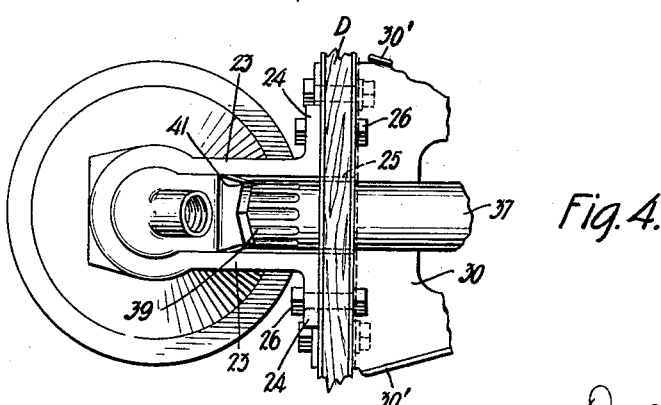
Inventor
Joseph Bijur.
by
Dean, Fairbank, Obright & Hirsch
his Attorneys

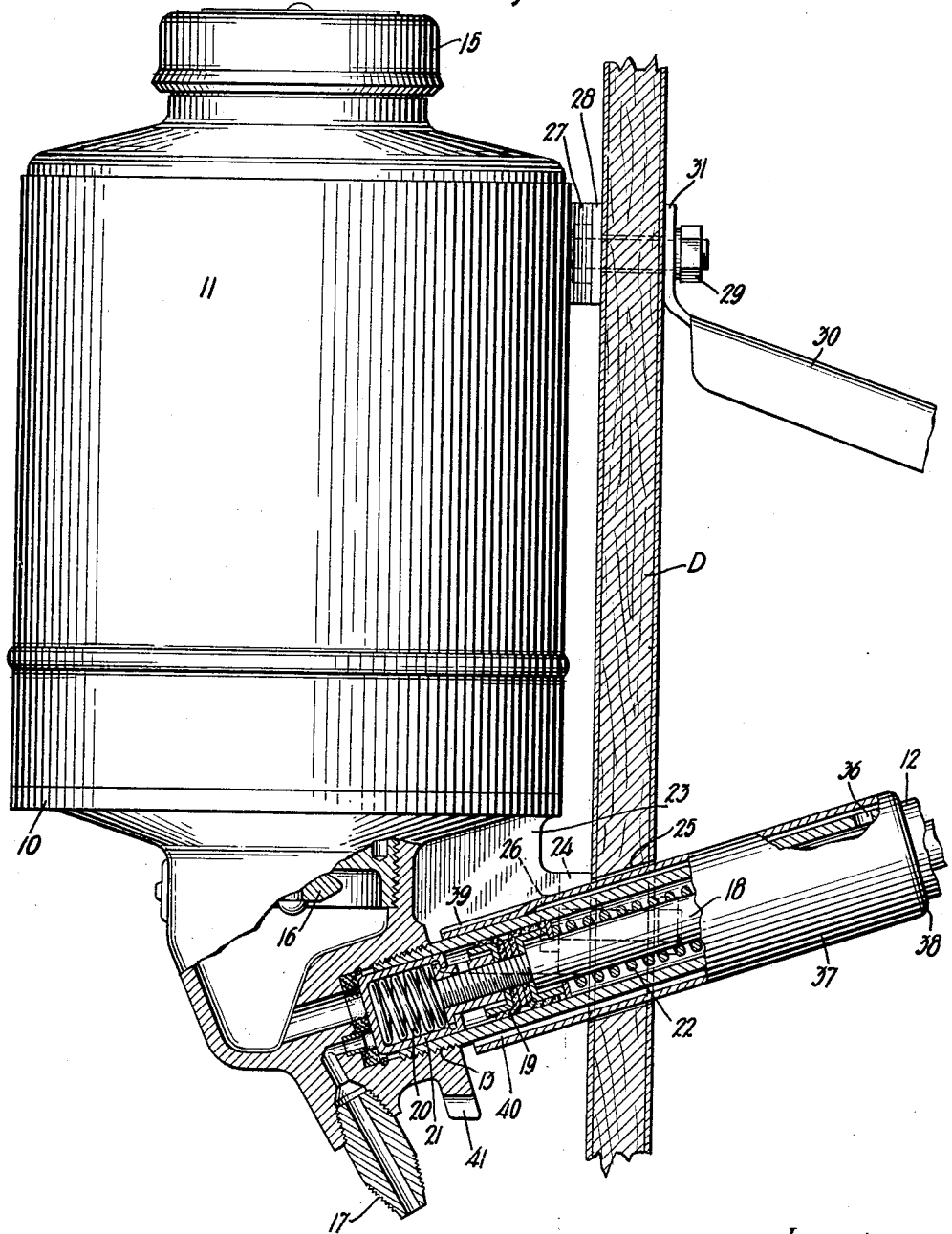

Patented Dec. 27, 1932

1,892,133

UNITED STATES PATENT OFFICE

JOSEPH BIJUR, OF NEW YORK, N. Y., ASSIGNOR TO AUTO RESEARCH CORPORATION, A CORPORATION OF DELAWARE

SUPPLY INSTALLATION FOR CENTRAL CHASSIS LUBRICATION

Original application filed April 9, 1927, Serial No. 182,362. Divided and this application filed May 21, 1927. Serial No. 193,090.

This application is a division of my copending application, Serial No. 182,362 filed April 9, 1927 now Patent No. 1,632,776, which in turn is a division of my copending application Serial No. 131,640 filed August 26, 1926 now Patent No. 1,632,773, all said applications being concerned with central chassis lubrication.

The invention relates to lubricant supply installations of the general type in which the pump plunger is conveniently accessible for operation thereof from the driver's seat, while the lubricant source or reservoir that supplies the pump is disposed exteriorly of the driver's compartment, where it is unobtrusive, where in cold weather the oil would be rendered fluid by heat from the power plant of the vehicle and where it may be conveniently filled without the danger of spilling on the floor. Since a construction of this character includes a pump portion extending exteriorly of the reservoir and toward the driver, any leakage past the pump plunger would tend to spread along the exposed parts of the pump, thereby wetting the hand of the operator, or soiling the driver's clothes.

It is an object of the invention to construct or arrange the supply installation so that the escape of oil into the driver's compartment is precluded, yet, without the use of a gland or a stuffing box. These are likely to leak at all times, and if adjusted tight would introduce objectionable friction on the operating member.

The object is accomplished broadly by providing the installation with a drain portion in intercepting relation with such lubricant, that has escaped by the piston, which might otherwise leak or be forced out of the pump at the driver's compartment, said drain emitting from the engine side of the dashboard or other pump mounting panel, which in the preferred embodiment is the dashboard.

Preferably one or more small ports are provided in the pump structures immediately beyond the extreme outer position of the pump plunger, so that such oil as has escaped past the pump plunger simply overflows through these ports exteriorly of the pump. Where these ports are at the driver's side of the compartment the drain may lead forward through the dashboard to deliver at the engine side thereof. In a preferred construction for this purpose a sleeve encircles the pump and is spaced from the pump cylinder for the main length thereof, and affords an outlet port beyond or in front of the dashboard through which the leaking lubricant escapes.

The drain passage is preferably closed at the end thereof nearest the driver and is directed forward through the dashboard and inclined downward, and of cross section sufficient for free flow of any escaped lubricant to drain from out of the installation upon the road.

In the accompanying drawings in which is shown one of various possible embodiments of the several features of the invention, Fig. 1 is a side view of the complete installation mounted on a dashboard, parts being shown in section, Fig. 2 is a top plan view of the installation, Fig. 3 is a fragmentary view similar to Fig. 1 on a larger scale, with parts broken away to disclose interior construction, and;

Fig. 4 is a bottom plan view of the reservoir.

Referring now to the drawings, I have shown a lubricant reservoir and pump assembly, preferably comprising a rugged cast element or bottom 10 for the reservoir, the side wall 11 of which may be made of sheet metal. The cast bottom 10 accommodates the base of a pump cylinder 12, preferably a length of pipe secured by screwing at 13 into a corresponding socket in the cast bottom 10, and extending obliquely upward therefrom.

The detailed construction of the reservoir and pump per se and in combination, constituting the subject-matter of the earlier application, Serial No. 131,640 above identified, are not material to the invention claimed herein and are, therefore, not fully described.

It may be briefly noted, however, that the reservoir includes a filling cap 15 and has a check valve 16, preferably in the cast bottom structure 10, which valve is seated during pump discharge and prevents return flow to the reservoir, so that the oil is forced out in pump discharge, into the pipe line (not shown) by way of the outlet nipple 17 in the bottom of the reservoir.

The pump comprises a piston rod 18 having a piston cup structure 19 at the end thereof and a buffer structure including a spring 20 enclosed in a thimble 21 and urged by the coil spring 22 to normally close preferably both the inlet to and the outlet from the pump the column length of which spring serves to stop the outward movement of the piston structure 19.

The reservoir and pump combination is mounted preferably upon the dashboard of an automobile in a manner now to be described. For this purpose, the cast bottom 10 is formed integral with a pair of webs 23 having feet 24 determining a mounting flange. The dashboard D is provided with an aperture 25 of diameter but little larger than that of the pump cylinder, so that the pump and reservoir combination may be applied to the dashboard by passing the pump cylinder through aperture 25 from the engine side of the dashboard, until the mounting flange 24 comes into face contact with the dashboard. The flange is then clamped tight against the dashboard by bolts and nuts 26 passed through the dashboard and clamping the mounting feet in position thereagainst.

While the attachment described is generally sufficient, it may be desirable to steady the upper end of the reservoir by additional securing means. For this purpose, a strap 27 is soldered to the outside of the reservoir and has laterally extending ears 28 which are clamped against the dashboard by bolts and nuts 29 therethrough.

The pump cylinder structure 12 being preferably of substantial length and small diameter protrudes for a substantial length into the driver's compartment under the instrument-board (not shown). In order to steady the outer end of said cylinder, a bracket is preferably provided which is secured to some fixed part of the driver's compartment. In the preferred embodiment shown, the bracket comprises a generally triangular stamping 30 having a ledge 31 at its wider end or base secured against the driver's side of the dashboard, preferably by the same bolts 29, which serve for attachment of the strap 27 of the reservoir. The forward or apex end of the bracket is formed as a strap 32 encircling the outboard end of the pump cylinder, and clamped thereabout by bolt 33. The sides of the bracket 30 are provided with downturned ledges 30' which stiffen the same to resist sway of the pump cylinder in a vertical plane, while the main web of the bracket affords considerable stiffness in the plane thereof to resist lateral sway of the cylinder.

It is desired to provide a pump operating knob 34 of relatively large diameter for convenience of operation, but such knob could not be passed through the small dashboard aperture 25. Accordingly, the knob is left off the pump prior to installing the same upon the dashboard, the entire length of the pump cylinder without the knob being of smaller diameter than aperture 25. After the installation is complete, the knob can then be applied upon the free end of the pump piston rod and secured in position by means of a locked nut 35.

It will be seen that the installation is readily affixed to the dashboard, and that in use, the single rugged mounting casting 10 supports the entire weight of the reservoir and of its contents and takes the thrust exerted in pump operation. The casting being securely mounted directly against the dashboard, leverage tending to loosen the same, is avoided.

The arrangement for mounting the pump and reservoir thus far described is not per se claimed herein, but is the subject-matter of the parent application Serial No. 182,362 above identified.

To avoid dripping of oil into the driver's compartment from the reservoir or the wetting of the pump handle or exposed length of cylinder, with oil leaked past the pump piston, I direct such oil to drain from the engine side of the dashboard. In a preferred embodiment, the pump cylinder is provided with one or more outlets in advance of the pump piston, illustratively shown as apertures 36 immediately beyond the outermost position of the pump piston structure. I have shown a sheet metal drain sleeve or gutter 37 of the diameter larger than that of the pump cylinder which encircles the same and is inturned at its upper end at 38 immediately beyond the drain apertures, into snug engagement with said cylinder. The inner end of the drain sleeve is securely affixed to the pump by longitudinal ribs 39 embossed inward thereupon, affording passage 40 therebetween, through which the leaking lubricant will escape from in front of the dashboard.

Any lubricant thus draining from in front of the dashboard, if allowed to flow toward, and to wet the nipple 17 which supplies the pipe line (not shown) might create the mistaken impression that there is a leak at the threads of said nipple. Accordingly, the support base 10 immediately below the outlet end of the drain sleeve 37 has a structure with one or more drip points or apices 41 from which the oil leaking from the drain sleeve and spreading along casting 10 will drip off, before it can reach the nipple 17.

Preferably the drip points 41 are conformed as a bifurcated structure straddling the pipe line, so that the leaking oil will not wet the latter.

Inasmuch as the drain arrangement described, precludes the escape of lubricant from the operating head of the pump, I dispense with the need for a packing or gland at the outer end of the pump. Such packing or glands not only add expense, but induce large and irregular frictional resistance, thereby impairing the ease and regularity of pump operation. Accordingly, I provide merely a solid metal button 42 as the head of the cylinder.

I claim:

1. A supply installation for a chassis lubricating system including a pump cylinder having a piston therein manually operable from in back of the dashboard, one or more outlets from the pump cylinder at the part thereof in back of the dash through which may escape any lubricant passing beyond the pump piston, and a drain sleeve encircling the cylinder intercepting such escaped lubricant and leading the same to escape from in front of the dashboard.

2. A supply installation for a chassis lubricating system including a pump cylinder having a piston therein manually operable from in back of the dashboard, one or more outlets from the pump cylinder at the part thereof in back of the dash through which may escape any lubricant passing beyond the pump piston, and a drain sleeve, said drain sleeve being inturned at its outer end into snug engagement with the pump cylinder and the draining end of said tube having longitudinal ribs embossed inward for snug engagement with the cylinder and affording drain passages therebetween.

3. A supply installation for a chassis lubricating system comprising a reservoir disposed in front of the dashboard, a pump cylinder having a piston therein connected to derive its charge from the reservoir, upwardly inclined therefrom and manually operable from in back of the dashboard, said pump having an associated part normally shutting off the escape of oil from the reservoir into the pump cylinder and having a packingless head, one or more outlet ports from the pump cylinder at the part thereof in back of the dash through which may escape any lubricant passing beyond the pump piston and a drain sleeve encircling the cylinder intercepting such escaped lubricant and leading the same to escape from in front of the dashboard.

4. A supply installation for a chassis lubricating system including a plunger pump mounted at the driver's compartment and having an operating member accessible from said compartment, said pump including a cylinder, a sleeve encircling said cylinder having a drain outlet delivering exteriorly of the compartment, said cylinder communicating with the interior of said drain sleeve at a part beyond the outer limit of the plunger.

5. A chassis lubricating supply installation including the assembly of a reservoir and a pump, an outlet therefrom, means attaching said assembly against the dashboard of a motor vehicle with the pump element thereof protruding rearward through a corresponding aperture in the dashboard, drain ports for escape of leaking lubricant from the pump at the engine side of the dashboard, said structure including one or more drip apices to cause the leaking lubricant to drip off beyond said outlet, thereby avoiding the appearance of a leak at said outlet.

6. A supply installation for a chassis lubricating system comprising a reservoir affixed to the front of an automobile dash board, an elongated pump cylinder fixed with respect to said reservoir and with the major portion of the length thereof extending rearwardly through a circular hole in the dash board, a piston in said pump cylinder, stop means limiting the displacement of said piston, a plurality of open drain apertures through said cylinder immediately beyond the limiting stop for said piston, and a drain gutter exteriorly of said cylinder in communication with said drain apertures and extending through the circular aperture in the dash board to discharge forwardly of said dash board.

7. A supply installation for a chassis lubricating system including a reservoir mounted at the forward side of the dash board, a pump cylinder fixed with respect to said reservoir and protruding through said dash board to the driver's compartment in an upward direction, a piston in said pump cylinder, stop means for said piston, a plurality of symmetrically arranged open drain apertures in said cylinder immediately beyond said stop means, drain gutter means in communication with said drain apertures and extending exteriorly of said pump cylinder through the dash board and opening at the lower end thereof to discharge to the road, whereby one or more drain apertures in the cylinder will at all times be lower than the others and will discharge oil that has leaked past the piston.

Signed at New York city in the county of New York and State of New York this 20th day of May A. D. 1927.

JOSEPH BIJUR.